(12) United States Patent
Honda et al.

(10) Patent No.: US 8,169,848 B2
(45) Date of Patent: May 1, 2012

(54) NONVOLATILE MEMORY DEVICE, NONVOLATILE MEMORY SYSTEM, AND ACCESS DEVICE

(75) Inventors: Toshiyuki Honda, Kyoto (JP);
Masahiro Nakanishi, Kyoto (JP);
Hirofumi Nakagaki, Osaka (JP)

(73) Assignee: Panasonic Corporation, Osaka (JP)

( * ) Notice: Subject to any disclaimer, the term of this patent is extended or adjusted under 35 U.S.C. 154(b) by 503 days.

(21) Appl. No.: 12/374,670

(22) PCT Filed: Jul. 26, 2007

(86) PCT No.: PCT/JP2007/064677
§ 371 (c)(1),
(2), (4) Date: Mar. 19, 2009

(87) PCT Pub. No.: WO2008/013230
PCT Pub. Date: Jan. 31, 2008

(65) Prior Publication Data
US 2009/0210621 A1 Aug. 20, 2009

(30) Foreign Application Priority Data
Jul. 26, 2006 (JP) .................................. 2006-203536

(51) Int. Cl.
*G11C 5/14* (2006.01)
(52) U.S. Cl. .................................. 365/226; 365/185.33
(58) Field of Classification Search .................. 365/226, 365/185.33
See application file for complete search history.

(56) References Cited

U.S. PATENT DOCUMENTS

| | | | |
|---|---|---|---|
| 6,712,277 B2 | 3/2004 | Spencer | |
| 7,213,112 B2 * | 5/2007 | Seo et al. | ...................... 711/154 |
| 2002/0174337 A1 | 11/2002 | Aihara | |
| 2003/0065866 A1 | 4/2003 | Spencer | |
| 2004/0213068 A1 | 10/2004 | Matsue | |
| 2006/0019705 A1 | 1/2006 | Fukuda | |
| 2006/0101110 A1 * | 5/2006 | Grossman | ...................... 709/200 |
| 2006/0124755 A1 | 6/2006 | Ito | |
| 2007/0214309 A1 | 9/2007 | Matsuura et al. | |
| 2008/0049504 A1 | 2/2008 | Kasahara et al. | |
| 2008/0168252 A1 | 7/2008 | Kunimune et al. | |
| 2008/0250188 A1 | 10/2008 | Nakanishi et al. | |
| 2008/0307152 A1 | 12/2008 | Nakanishi et al. | |

FOREIGN PATENT DOCUMENTS

JP 2002-197431 7/2002

(Continued)

OTHER PUBLICATIONS

English language Abstract of JP 2006-101542, Apr. 13, 2006.
English language Abstract of JP 2002-197431, Jul. 12, 2002.
English language Abstract of JP 2006-114960, Apr. 27, 2006.

(Continued)

*Primary Examiner* — Huan Hoang
(74) *Attorney, Agent, or Firm* — Greenblum & Bernstein, P.L.C.

(57) ABSTRACT

Power consumption required for making a nonvolatile storage device having a radio communication function operate as a file server for a radio host device is great for a host device which supplies the power. The present invention enables a user to operate a host device to which the nonvolatile storage device having the radio communication function is attached so as to activate and inactivate the radio communication function of the nonvolatile storage device. This reduces unnecessary power consumption by the radio communication function.

17 Claims, 15 Drawing Sheets

| | FOREIGN PATENT DOCUMENTS | |
|---|---|---|
| JP | 2002-199121 | 7/2002 |
| JP | 2002-329180 | 11/2002 |
| JP | 2003-101433 | 4/2003 |
| JP | 2003-187203 | 7/2003 |
| JP | 2004-326937 | 11/2004 |
| JP | 2006-25173 | 1/2006 |
| JP | 2006-101542 | 4/2006 |
| JP | 2006-114960 | 4/2006 |

OTHER PUBLICATIONS

English language Abstract of JP 2006-25173, Jan. 26, 2006.
English language Abstract of JP 2003-187203, Jul. 4, 2003.
English language Abstract of JP 2002-199121, Jul. 12, 2002.
English language Abstract of JP 2003-101433, Apr. 4, 2003.
English language Abstract of JP 2002-329180, Nov. 15, 2002.
English language Abstract of JP 2004-326937, Nov. 18, 2004.

* cited by examiner

F I G. 2
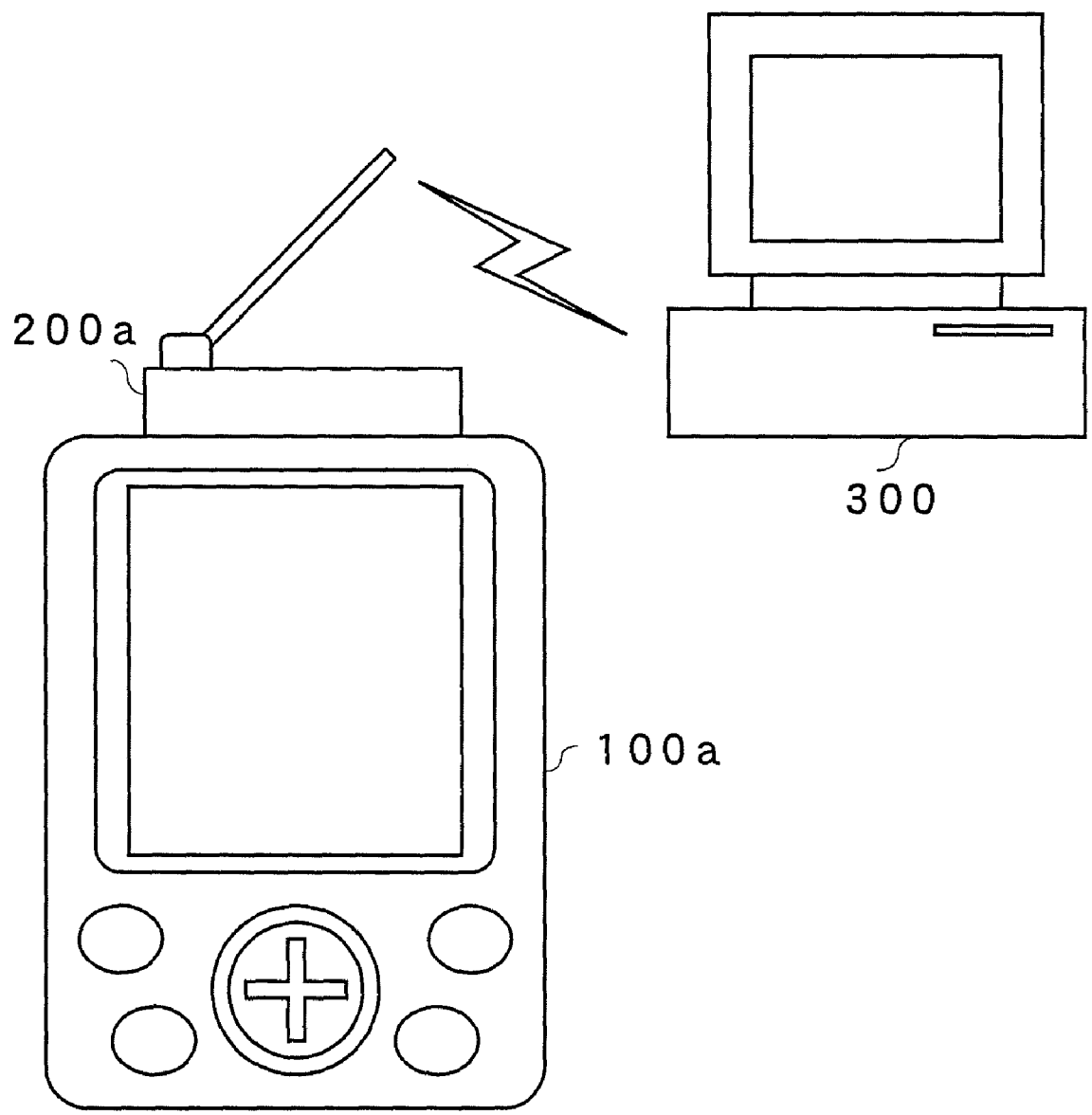

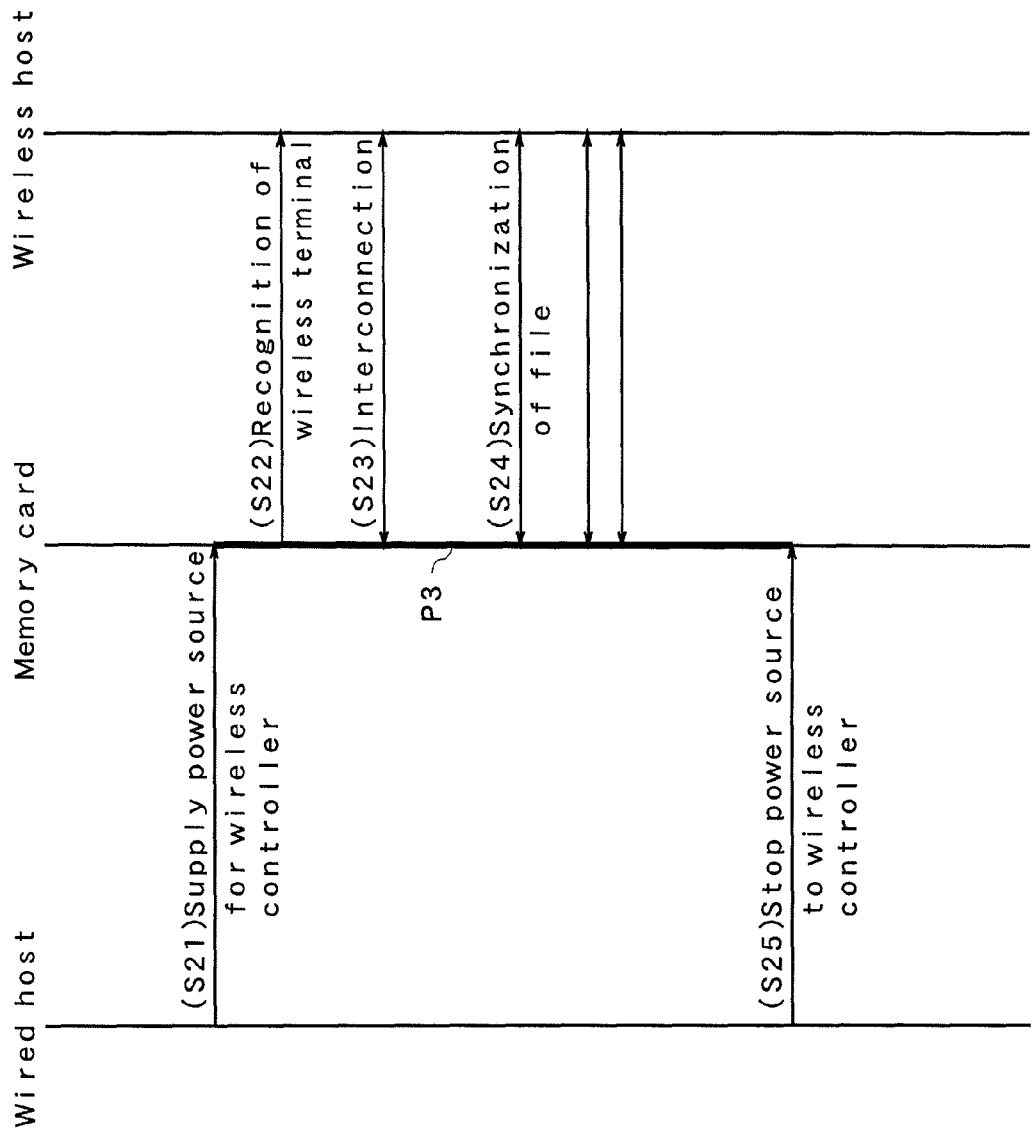

NONVOLATILE MEMORY DEVICE, NONVOLATILE MEMORY SYSTEM, AND ACCESS DEVICE

TECHNICAL FIELD

The present invention relates to a nonvolatile memory device, nonvolatile memory system, and host device characterized in a switching control that switches a wireless communicating function to be active or to be inactive with using a nonvolatile memory device having a wireless communicating function.

BACKGROUND ART

In these years, a memory card mounting a flash memory, a nonvolatile memory, expands its market as a recording medium for a digital camera and a mobile phone. In addition, the number of files which can be recorded in the memory card also increases with a capacity increase of the memory card. A data amount of FAT file system information required to handle the memory card accordingly has been increasing in a host device, and, as a result, a data amount of the FAT file system information transmitted and received between the memory card and the host device has been increasing.

Patent document 1 cites a problem that writing performance of data other than the FAT file system information deteriorates in a case where the data amount of the FAT file system information is large. In Patent document 1, a memory card controller for managing a file system structure based on the FAT file system information is provided in the memory card to handle the problem. This can reduce a frequency of the transmission and reception of the FAT file system information between the memory card and the host device. In Patent document 1, proposed is a memory card that prevents data reading and data writing performances from deteriorating in this way.

The networking of devices is progressing, however, conventionally only the host devices connect to the network. Now, a nonvolatile memory device (storage device), including the memory card, able to connect to the network is retailed as a commercial product.

Patent document 2 shows an example of using the storage device having this wireless communicating function as a home server. However, the storage device in patent document 2 does not manage a file system structure as in Patent document 1. It can be expected that a memory card which is able to connect to the network and manages a file system structure will be increased.

Patent document 1: Japanese Unexamined Patent Publication No. 2003-187203

Patent document 2: Japanese Unexamined Patent Publication No. 2002-199121

DISCLOSURE OF THE INVENTION

Problems to be Solved by the Invention

It is beneficial for a user's convenience to enable the nonvolatile memory device having a wireless communicating function to be used as a file server on the network. The nonvolatile memory device, however, needs an electric power source used for operating a wireless communicating function, thus the nonvolatile memory device obtains the electric power from a host device on which the nonvolatile memory device is mounted even in a case of using the nonvolatile memory device such as the memory card mainly used with being mounted on a specific host device as a file server. The wireless communicating function, however, consumes comparatively a lot of electricity, and thus there is a problem that the host device must bear a large load of the electric power source in a case where the host device is driven by a rechargeable battery without connecting to a stable power source.

Means to Solve the Problems

To solve the problems, a nonvolatile memory device according to the present invention in which data can be read and written from an outside, comprises: a nonvolatile memory for storing data; a controller which receives a power source supply from the outside by a wire for performing data communication with the outside by a wire and for performing data reading and writing with said nonvolatile memory; and a wireless controller including: a wireless communication part which receives the power source supply from the outside by a wire for performing data communication with the outside by wireless and for performing data reading and writing with said nonvolatile memory; and a wireless communicating function controller for switching a wireless data communication function by said wireless communication part to be on or to be off based on an order from the outside.

Said wireless communicating function controller may be a standby part for switching the wireless data communication function in said wireless communication part to be on or to be off by switching a power source of said wireless communication part to be on or to be off based on an order from the outside.

Said wireless communicating function controller may be a switch for switching the wireless data communication function in said wireless communication part to be on or to be off by connecting and disconnecting a power source line of the power source supplied to said wireless controller from the outside.

Said switch may be realized by a sliding movable part provided to said nonvolatile memory device.

Said switch may be realized by an antenna for performing wireless communication.

To solve the problems, a nonvolatile memory device according to the present invention in which data can be read and written from an outside, comprises: a nonvolatile memory for storing data; a controller which receives a power source supply from the outside by a wire for performing data communication with the outside by a wire and for performing data reading and writing with said nonvolatile memory; a wireless controller including: a wireless communication part which receives the power source supply from the outside by a wire for performing data communication with the outside by a wire and for performing data reading and writing with said nonvolatile memory; and a wireless communicating function controller for switching a wireless data communication function by said wireless communication part to be on or to be off based on an order from the outside; and a plurality of independent power source lines for receiving a power source supplied from an outside by wires, wherein a plurality of said power source lines include a power line for supplying the power source to said wireless controller.

To solve the problems, a host device according to the present invention which can physically attach and detach to a nonvolatile memory device having a wireless communication function and supplies a power source to the nonvolatile memory device by a wire when connecting to the nonvolatile memory device, comprises: a user interface for inputting an order from an outside; and a processor for transmitting an order to switch a wireless communication function of said nonvolatile memory device to be activated or to be inactivated to said nonvolatile memory device based on an order received from said user interface.

To solve the problems, a host device according to the present invention which can physically attach and detach to a nonvolatile memory device having a wireless controller for performing wireless communication, comprises: a user interface for inputting an order from an outside; a power source supplying part, which includes a power source terminal for supplying a power source to said wireless controller and a plurality of independent power source terminals for supplying the power source to respective portions other that the wireless controller in said nonvolatile memory device, for switching the power source terminal for supplying the power source to said wireless controller to be connected or to be disconnected; and a processor for transmitting an order to switch the power source terminal for supplying the power source to said wireless controller to be connected or to be disconnected to said power source supplying part based on an order received from said user interface.

To solve the problems, a host device according to the present invention which can physically attach and detach to a nonvolatile memory device having a wireless communication function and supplies a power source to the nonvolatile memory device by a wire when connecting to the nonvolatile memory device, comprises: a power source detector for detecting whether or not the power source is supplied from an outside; and a processor for transmitting an order to switch the wireless communication function of said nonvolatile memory device to be activated or to be inactivated to said nonvolatile memory device depending on the detection by said power source detector concerning whether or not the power source is supplied.

To solve the problems, a nonvolatile memory system according to the present invention comprises: a host device; a nonvolatile memory device which can be physically attached and detached to and from said host device and which performs data communication with said host device by a wire and includes a wireless communication function; and a host device which performs the data communication with said a nonvolatile memory device, wherein said nonvolatile memory device includes: a nonvolatile memory for storing data; a controller which receives a power source supply from the outside by a wire for performing data communication with the outside by a wire and for performing data reading and writing with said nonvolatile memory; and a wireless controller including: a wireless communication part which receives the power source supply from the outside by a wire for performing data communication with the outside by a wire and for performing data reading and writing with said nonvolatile memory; and a wireless communicating function controller for switching a wireless data communication function by said wireless communication part to be on or to be off based on an order from the outside.

Said host device may include: a user interface for inputting an order from an outside; and a processor for transmitting an order to switch a wireless communication function of said nonvolatile memory device to be activated or to be inactivated to said nonvolatile memory device based on an order received from said user interface, and said wireless communicating function controller may be a standby part for switching the wireless data communication function in said wireless communication part to be on or to be off by switching a power source of said wireless communication part to be on or to be off based on an order from the outside.

To solve the problems, a nonvolatile memory system according to the present invention comprises: a host device; a nonvolatile memory device which can be physically attached and detached to and from said host device and which performs data communication with said host device by a wire and includes a wireless communication function; and a host device which performs the data communication with said a nonvolatile memory device, wherein said nonvolatile memory device includes: a nonvolatile memory for storing data; a controller which receives a power source supply from the outside by a wire for performing data communication with the outside by a wire and for performing data reading and writing with said nonvolatile memory; a wireless controller including: a wireless communication part which receives the power source supply from the outside by a wire for performing data communication with the outside by a wire and for performing data reading and writing with said nonvolatile memory; and a wireless communicating function controller for switching a wireless data communication function by said wireless communication part to be on or to be off based on an order from the outside; and a plurality of independent power source lines which receive a power source supplied from an outside and include a power line for supplying the power source to said wireless controller, and said host device includes: a user interface for inputting an order from an outside; a power source supplying part, which includes a power source terminal for supplying a power source to said wireless controller and a plurality of independent power source terminals for supplying the power source to respective portions other that the wireless controller in said nonvolatile memory device, for switching the power source terminal for supplying the power source to said wireless controller to be connected or to be disconnected; and a processor for transmitting an order to switch the power source terminal for supplying the power source to said wireless controller to be connected or to be disconnected to said power source supplying part based on an order received from said user interface.

Said wireless communicating function controller may be a switch for switching the wireless data communication function in said wireless communication part to be on or to be off by connecting and disconnecting a power source line of the power source supplied to said wireless controller from the outside.

Said switch may be realized by a sliding movable part provided to said nonvolatile memory device.

Said switch may be realized by an antenna for performing wireless communication.

Said host device may include: a power source detector for detecting whether or not the power source is supplied from an outside; and a processor for transmitting an order to switch the wireless communication function of said nonvolatile memory device to be activated or to be inactivated to said nonvolatile memory device depending on the detection by said power source detector concerning whether or not the power source is supplied from an outside, and said wireless communicating function controller may be a standby part for switching the wireless data communication function in said wireless communication part to be on or to be off by switching a power source of said wireless communication part to be on or to be off based on an order from the outside.

To solve the problems, a nonvolatile memory system according to the present invention comprises: a host device; a nonvolatile memory device which can be physically attached and detached to and from said host device and which performs data communication with said host device by a wire and includes a wireless communication function; and a host device which performs the data communication with said a nonvolatile memory device, wherein said nonvolatile memory device includes: a nonvolatile memory for storing data; a controller which receives a power source supply from said host device by a wire for performing data communication with said host device by a wire and for performing data reading and writing with said nonvolatile memory; and a wireless controller including: a wireless communication part which receives the power source supply from said host device by a wire for performing data communication with said host device by wireless and for performing data reading and writing with said nonvolatile memory; and a wireless communicating function controller for switching the power source supplied from said host device to be on or to be off; and a plurality of independent power source lines which receive a power source supplied from said host device and include a power line for supplying the power source to said wireless controller, and said host device includes: a power source detector for detecting whether or not the power source is supplied from an outside; a power source supplying part, which includes a power source terminal for supplying a power source to said wireless controller and a plurality of independent power source terminals for supplying the power source to respective portions other that the wireless controller in said nonvolatile memory device, for switching the power source terminal for supplying the power source to said wireless controller to be connected or to be disconnected; and a processor for transmitting an order to switch the power source terminal for supplying the power source to said wireless controller to be connected or to be disconnected to said power source supplying part depending on the detection by said power source detector concerning whether or not the power source is supplied.

Effectiveness of the Invention

According to the present invention, in the nonvolatile memory system having the nonvolatile memory device with the wireless communicating function, the host device can consume less power source and the nonvolatile memory system can avoid the performance deterioration of an access from a user. Additionally in the nonvolatile memory system according to the present invention, since the user can arbitrarily switch a wireless communicating function to be active or to be inactive, a function of the nonvolatile memory device as a file server can be restricted. The nonvolatile memory system can restrict data writing that is performed from outside to the nonvolatile memory device under a state where the user cannot recognize the writing.

BRIEF DESCRIPTION OF DRAWINGS

FIG. 2 is a schematic view showing the configuration of the nonvolatile memory system according to embodiment 1 of the present invention.

FIG. 7 is a sequence diagram showing an operation of the nonvolatile memory system according to embodiment 3 of the present invention.

Figure 1:
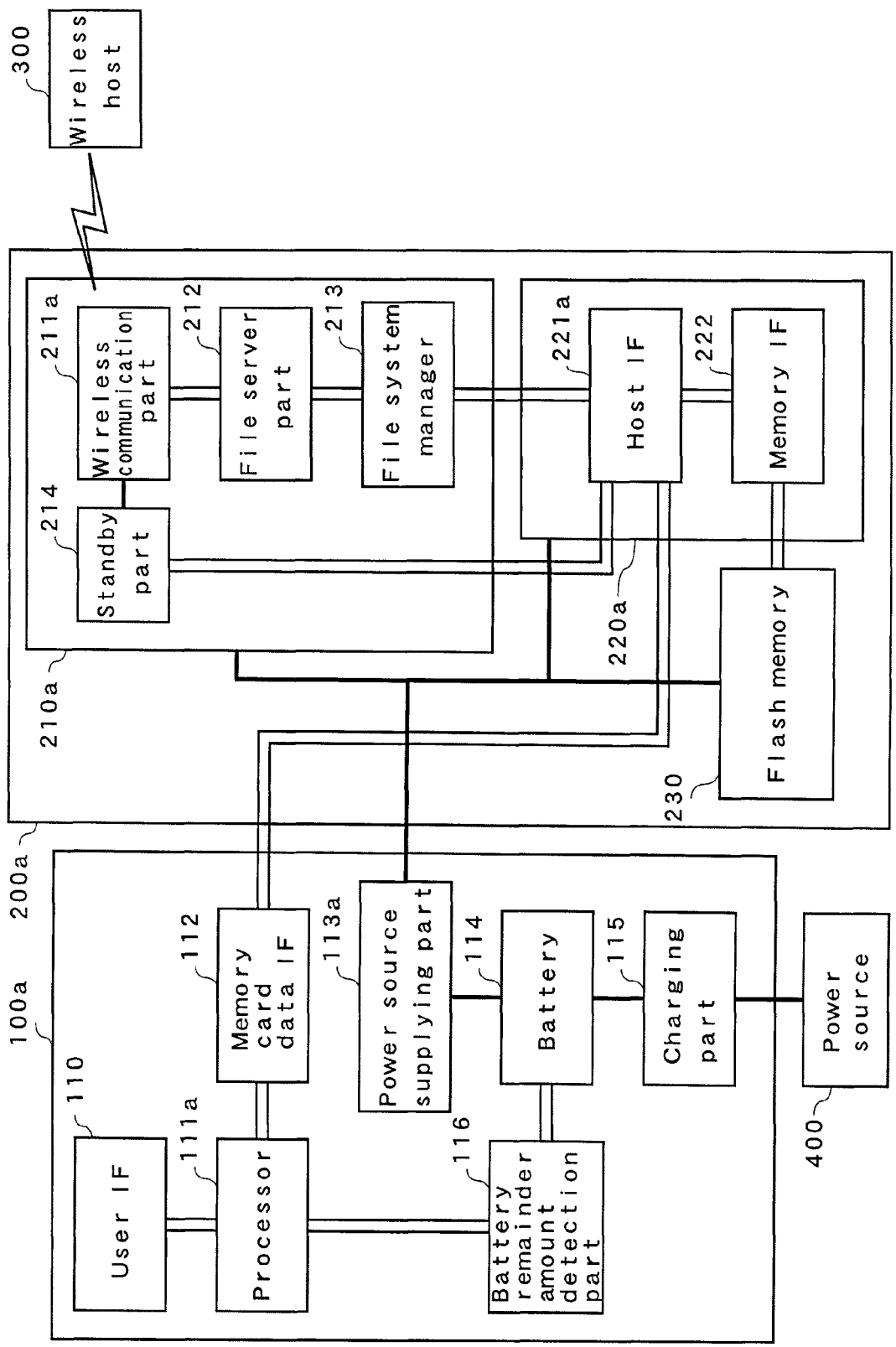
FIG. 1 is a view showing a configuration of a nonvolatile memory system according to embodiment 1 of the present invention.

EXPLANATION FOR REFERENCE NUMERALS 100a to 110e Wired host
200a to 200d Memory card
300 Wireless host
400 Power source
110 User interface
111a to 110c Processor
112 Memory card data IF
113a, 113b Power source supplying part
114 Battery
115 Charging part
116 Battery remainder amount detection part
117 Power source detector
118 Memory card file IF
210a to 210c Wireless controller
211a, 211b Wireless communication part
212, 223 File server part
213, 224 File system manager
214 Stand-by part
220a to 220c Controller
221a to 221c Host interface
222 Memory interface
230 Flash memory
240 Wireless communication part power supplying line
250 Memory part power supplying line
260 Switch
261 Antenna
262 Movable part

BEST MODE FOR CARRYING OUT THE INVENTION (Embodiment 1)

Figure 3:
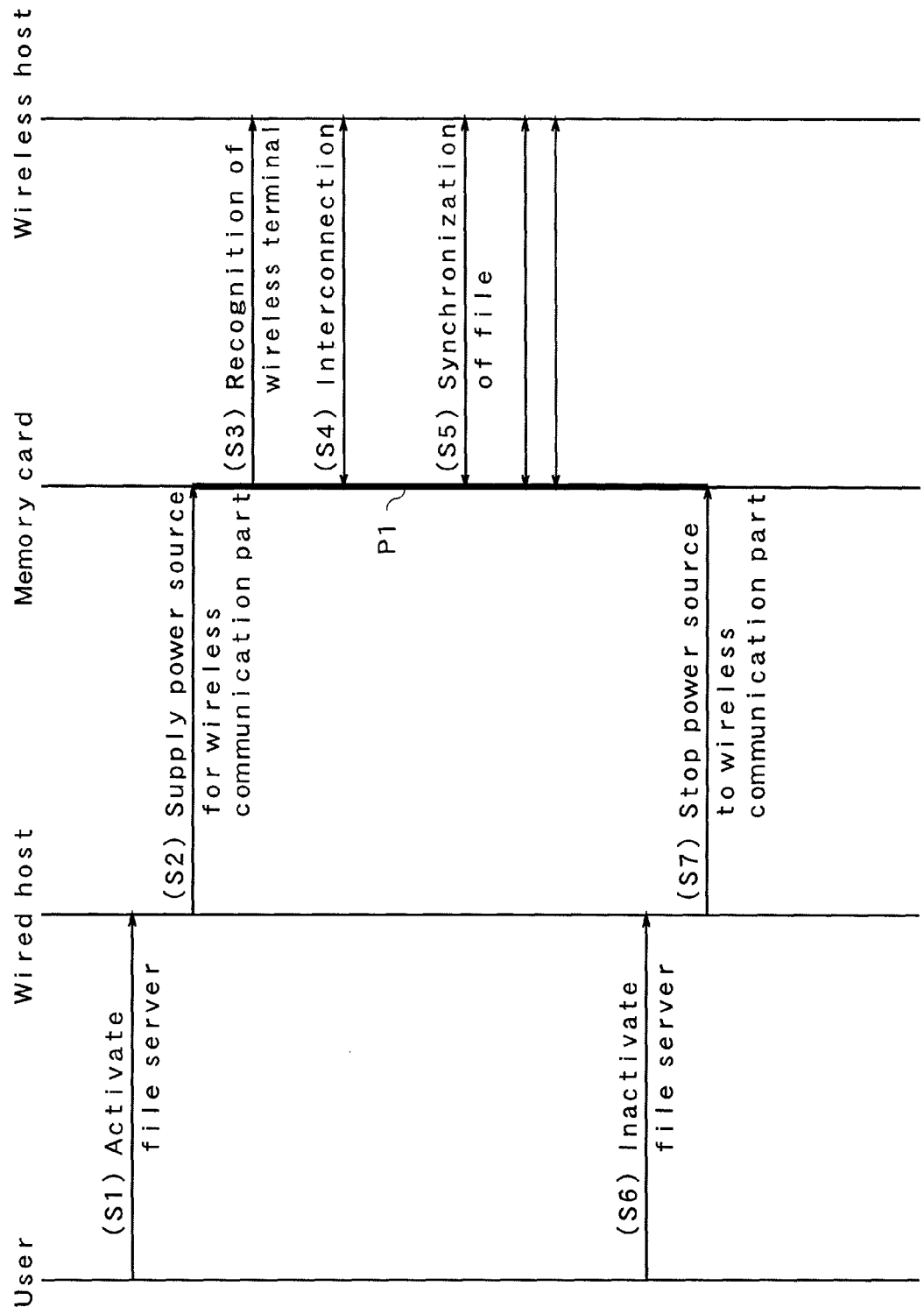
FIG. 3 is a sequence diagram showing an operation of the nonvolatile memory system according to embodiment 1 of the present invention.

Referring to FIG. 1 to FIG. 3, embodiment 1 of the present invention will be explained below. FIG. 1 is a block diagram showing a configuration example of a nonvolatile memory system according to embodiment 1 of the present invention. The configuration of the nonvolatile memory system of the present embodiment includes a wired host 100a, a memory card 200a that is a nonvolatile memory device, a wireless host 300, and a power source 400. In FIG. 1, thick solid lines represent power source lines for supplying a power source, and doubled solid lines represent signal lines for data and command. A memory card 200a is the nonvolatile memory device to which data can be written and from which the data can be read by the wired host 100a. The memory card 200a will be ready to be used by physically connecting to the wired host 100a that is a host device to obtain the power source.

FIG. 2 is a schematic view showing the configuration example of the nonvolatile memory system according to the present embodiment. In FIG. 2, the wired host 100a, memory card 200a, and wireless host 300 are shown. As shown in the figure, the wired host 100a includes user interfaces such as a display and buttons. The memory card 200a includes an antenna for wireless communication. The wireless host 300 is, for example, a personal computer. In FIG. 2, the memory card 200a is inserted to the wired host 100a that is a PDA. The memory card 200a receives supply of the power source from the wired host in this state, and is able to connect to the external wireless host 300 when the internal wireless communication part works.

Returning to FIG. 1, the wired host 100a includes a user interface (IF) 110, a processor 111a, and a memory card data interface (IF) 112. The wired host 100a further includes a power source supplying part 113a, a battery 114, a charging part 115, and a battery remainder amount detection part 116.

The user interface 110 is a group of interfaces communicating with a user who operates the wired host 100a, and includes an input interface such as a microphone, a keyboard, and a switch and includes an output interface such as a speaker and a display. The user interface 110 accepts an input from the user via a graphical user interface (GUI) on the display, and sends its inputted contents to the processor 111a.

The processor 111a totally controls the wired host 100a, and also controls file reading and writing performed to the memory card 200a. The processor 111a transmits and receives data and commands to and from the memory card data IF 112 based on the inputted contents by a user through the user interface 110. In addition, the processor 111a obtains information concerning a remaining charge of the battery from the battery remainder amount detection part 116 described below.

The memory card data IF 112 controls the data reading and writing by using a plurality of signal lines other than a power source line in the interface with the memory card 200a. The memory card data IF 112 transmits data and commands transmitted by the processor 111a to the memory card 200a and sends data and commands transmitted by the memory card 200a to the processor 111a.

The power source supplying part 113a controls the interface with the memory card 200a related to the power source, and supplies the power source supplied by the battery 114 to the memory card 200a.

The battery 114 is a secondary battery able to be recharged from outside, and supplies the power source to the power source supplying part 113a and is recharged by the charging part 115.

The charging part 115 recharges the battery 114 by using the power source supplied from the power source 400.

The battery remainder amount detection part 116 measures a remaining charge of the battery 114 and, when the remaining charge drops to a predetermined value or less, notifies the processor 111a that the remaining charge drops.

Meanwhile, the memory card 200a includes a wireless controller 210a, a controller 220a, and a flash memory 230, and is connected to the wired host 100a by wires via the memory card data IF 112 and power source supplying part 113a of the wired host 10a. The wireless controller 210a, controller 220a, and flash memory 230 are connected to the power source supplying part 113a by the power source line, and the controller 220a is further connected to the memory card data IF 112 by a data line.

The wireless controller 210a includes a wireless communication part 211a, a file server part 212, a file system manager 213, and a stand-by part 214.

The wireless communication part 211a transmits and receives data and commands to and from the wireless host 300 by wireless communication, and transmits and receives data and commands to and from the file server part 212. The wireless communication part 211a is connected to the file server part 212 by the signal line, and is further connected to the stand-by part 214 by the power source line.

The file server part 212 controls data reading and writing in units of files performed from and to the wireless host 300 via the wireless communication part 211a, and transmits and receives file data to and from the file system manager 213. The file server part 212 is connected to the wireless communication part 211a and the file system manager 213 by the signal lines.

The file system manager 213 manages a file system structure of file data transmitted and received to and from the wireless host 300. The file system manager 213 is connected to the file server part 212 and the host interface 221a of the controller 220a by the signal line.

The stand-by part 214 is a wireless communicating function controller, and controls turning on and off the power source of the wireless communication part 211a. The stand-by part 214 is connected to the wireless communication part 211a by the power source line, and is further connected to the host interface 221a by the signal line.

The controller 220a includes the host interface (IF) 221a and a memory interface (IF) 222.

The host interface 221a controls the interface with the wired host 100a related to data transmitting and receiving and also controls the interface with the wireless controller 210a related to data transmitting and receiving. The host interface 221a is connected to the memory card data IF 112 of the wired host 100a, the memory interface 222, the file system manager 213, and the stand-by part 214 by the signal line.

The memory interface 222 controls the interface with the flash memory 230 related to data reading and writing, and is connected to the flash memory 230 by the signal line.

The flash memory 230 is a nonvolatile memory such as the NAND type flash memory, and is connected to the memory interface 222 of the controller 220a by the signal line.

The wireless host 300 is a host device which reads and writes data from and to the memory card 200a, and transmits and receives the read and written data to and from the memory card 200a via the host interface 221a by wireless.

The power source 400 is a power source for recharging the battery of the wired host by connecting to the wired host. The power source 400 is connected to the charging part 115 of the wired host 100a.

In the nonvolatile memory system according to the present embodiment, the power source is supplied to the wireless controller 210a, the controller 220a, and the flash memory 230 from the wired host 100a by this configuration.

A method for controlling the power source of the wireless communication part 211a of the memory card 200a in the nonvolatile memory system having such configuration will be explained with using a sequence diagram of FIG. 3.

At first, it is assumed that an initial state of the memory card 200a is a state where the stand-by part 214 of the memory card 200a disconnects the power source of the wireless communication part 211a and where the wireless host 300 cannot access the memory card 200a. The state where the wireless host 300 cannot access the memory card 200a is referred to as that a function as a file server is inactive, and the state the access is possible is referred to as that the function as a file server is active.

In a case where a user enables an access from the wireless host 300 to the memory card 200a in this initial state, the user issues an order to activate the function as a file server of the memory card 200a via the GUI of the user interface 110 of the wired host 100a (S1).

The order issued at S1 is transmitted from the processor 111a to the host interface 221a of the memory card 200a via the memory card data IF 112 as a command for ordering to turn on the power to the wireless communication part 211a. The host interface 221a transmits this command to the stand-by part 214, the stand-by part 214 that received the command turns on the power source of the wireless communication part 211a, and the wireless communication part 211a is in an operating state (S2). According to this, a wireless communicating function of the wireless communication part 211a is activated.

The memory card 200a in which the power source is supplied to the wireless communication part 211a recognizes the wireless host 300 (S3), and subsequently connection between the memory card 200a and the wireless host 300 is established (S4). Then, the function as a file server of the memory card 200a is activated.

When the wireless host 300 requests the memory card 200a to read and write file data, files are synchronized and the reading and writing of file data are completed (S5).

To inactivate the function of the memory card 200a as a file server, the user issues an order for inactivating the function of the memory card 200a as a file server via the GUI of the user interface 110 of the wired host 10a (S6).

The order issued at S6 is transmitted from the processor 111a to the host interface 221a of the memory card 200a as a command for ordering a disconnection of the power source supplied to the wireless communication part 211a via the memory card data IF 112. The host interface 221a transmits this command to the stand-by part 214, the stand-by part 214 which received the command disconnects the power source to the wireless communication part 211a, and the operation of the wireless communication part 211a stops (S7). According to this, the wireless communicating function of the wireless communication part 211a is inactivated, and simultaneously the function of the memory card 200a as a file server is inactivated. A part of line of the memory card in the sequence view of FIG. 3 is drawn by a thick solid line, and this line shows an active period P1 where the wireless communicating function of the wireless communication part 211a is activated.

In the nonvolatile memory system according to the aforementioned embodiment, a user can arbitrarily switch the power source of the wireless communication part 211a to be turned on or to be turned off. In addition, this can prevent the wireless communication part 211a from wastefully consuming an electric power.

(Embodiment 2)

Figure 4:
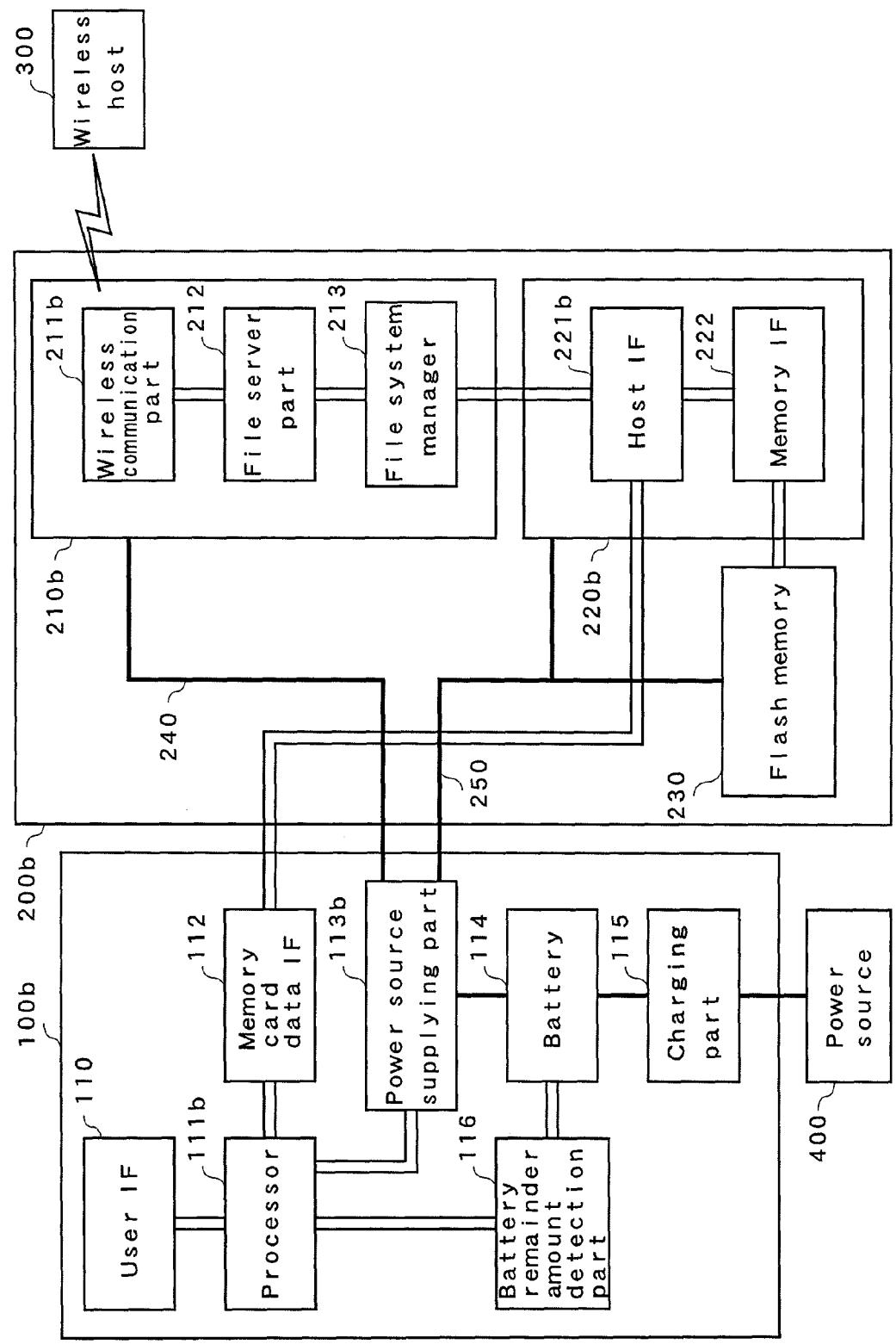
FIG. 4 is a view showing a configuration of a nonvolatile memory system according to embodiment 2 of the present invention.
Figure 5:
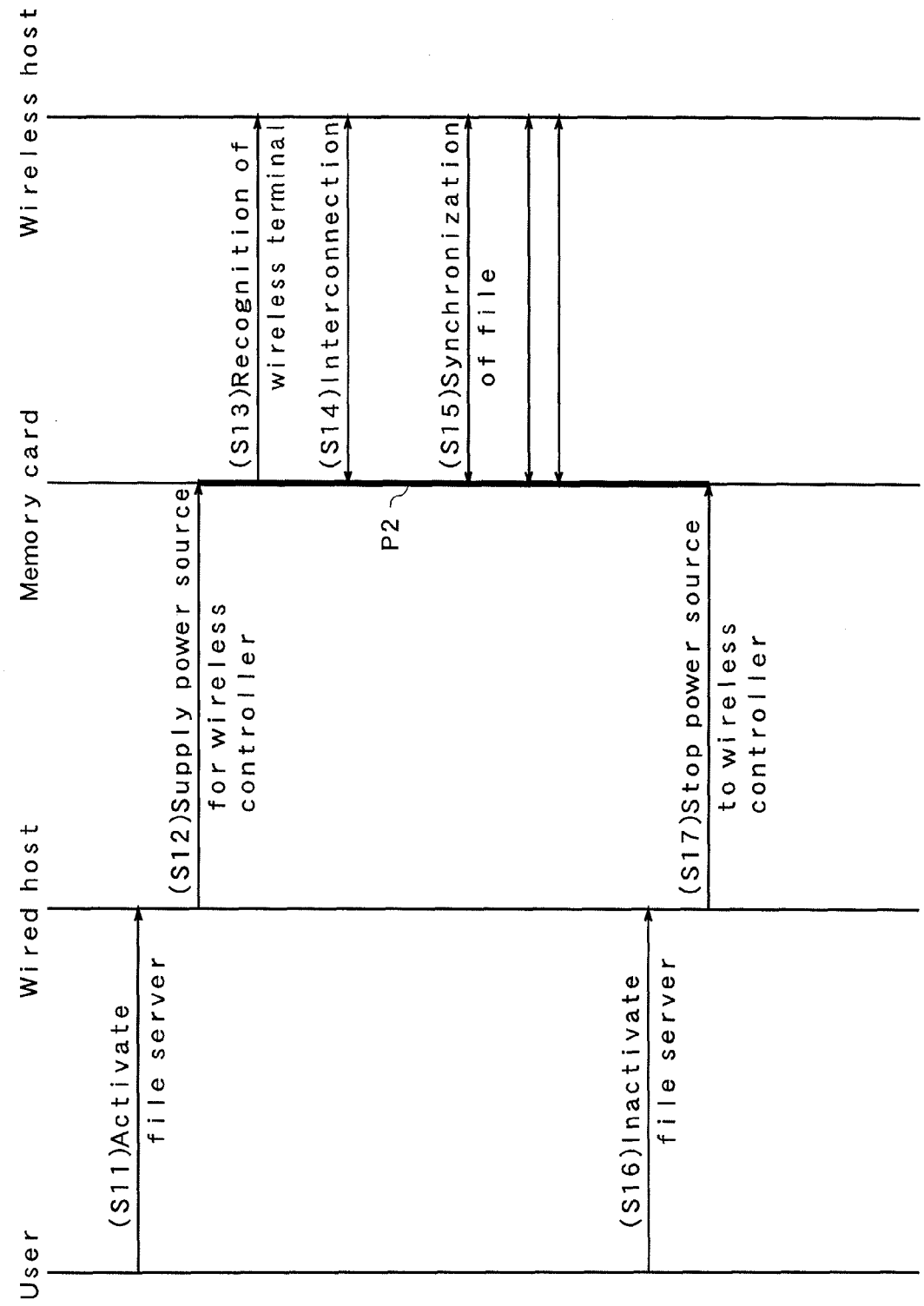
FIG. 5 is a sequence diagram showing an operation of the nonvolatile memory system according to embodiment 2 of the present invention.

Referring to FIG. 4 and FIG. 5, embodiment 2 of the present invention will be explained below. FIG. 4 is a block diagram showing a configuration example of a nonvolatile memory system according to embodiment 2 of the present invention. The nonvolatile memory system of the present embodiment is configured by including a wired host 100b, a memory card 200b that is a nonvolatile memory device, a wireless host 300, and a power source 400.

Detailed explanation of the same portions as those of embodiment 1 in FIG. 4 will be omitted by adding the same numerals. A processor 111b and a power source supplying part 113b in the wired host 100b, and a wireless communication part 211b of a wireless controller 210b and a host interface (IF) 212b of a controller 220b in a memory card 200b will be explained below.

The processor 111b totally controls the wired host 100b as the processor 111a in embodiment 1, and also controls the reading and writing of files to the memory card 200b. The processor 111b in the present embodiment sends a command for ordering turning on or turning off the power to the memory card 200b based on contents inputted by a user via the user interface 110 to the power source supplying part 113b described below.

The power source supplying part 113b supplies the power source supplied from the battery 114 to the memory card 200b. The power source supplying part 113b includes a plurality of power source terminals for connecting to a wireless communication part power supplying line 240 connecting to the wireless controller 210b and for connecting to the memory part power supplying line 250 connecting to the controller 220b and the flash memory 230, respectively. The power source supplying part 113b further controls an interface of the power source for the memory card 200b, and switches the power source to be turned on or turned off independently from the wireless communication part power supplying line 240 and the memory part power supplying line 250.

The wireless communication part 211b transmits and receives data and commands to and from the wireless host 300 by wireless communication, and transmits and receives data and commands to and from the file server part 212 same as the wireless communication part 211a in embodiment 1. However, different from that of the wireless communication part 211a, the power source thereof is directly obtained from the wireless communication part power supplying line 240 without passing through a block such as the stand-by part 214.

The host interface 221b controls an interface related to data transmitting and receiving to the wired host 100b, and also controls an interface related to data transmitting and receiving to the wireless controller 210b. The host interface 221b is connected to the memory card data IF 112 of the wired host 100b, the file system manager 213, and the memory interface 222 by signal lines.

In FIG. 4, other configurations which are not mentioned above are the same as those explained in embodiment 1. According to such configurations, in the nonvolatile memory system of the present embodiment, the power source is supplied to the wireless controller 210b, the controller 220b, and the flash memory 230 from the wired host 100b.

Referring to a sequence diagram in FIG. 5, a method for controlling the power source of the wireless communication part 211b in the memory card 200b in the nonvolatile memory system of the above mentioned configuration will be explained below.

At first, an initial state of the wired host 100b is assumed to be a state where the power source supplying part 113b supplies the power source to the memory part power supplying line 250 and disconnects the power source to the wireless communication part power supplying line 240 and where the power source is not supplied to the wireless controller 210b and an access from the wireless host 300 to the memory card 200b is impossible.

When a user enables an access from the wireless host 300 to the memory card 200b in this initial state, the user issues an order for activating a file server function of the memory card 200b via the GUI of the user interface 110 in the wired host 100b (S11).

The order issued at S11 is conveyed from the processor 111b to the power source supplying part 113b as a command for ordering to turn on the power source for the wireless controller 210b. The power source supplying part 113b which received this command turns on the power source for the wireless communication part power supplying line 240, thus the wireless controller 210b works (S12). This activates a function of wireless communication of the wireless communication part 211b.

The memory card 200b in which the wireless communicating function of the wireless communication part 211b is activated recognizes the wireless host 300 (S13), and subsequently establishes a connection between the memory card 200b and the wireless host 300 (S14). Here, a file server function of the memory card 200b is activated.

When the wireless host 300 requires reading and writing of data from and to the memory card 200b, file synchronization is executed and the reading and writing of file data is completed (S15).

When the user nullifies the file server function of the memory card 200b, the user issues an order for nullifying the file server function of the memory card 200b via the GUI of the user interface 110 in the wired host 100b (S16).

The order issued at S16 is transmitted from the processor 111b to the power source supplying part 113b as a command for ordering to turn off the power source for the wireless controller 210b. The power source supplying part 113b which received this command turns off the power source for the wireless communication part power supplying line 240, thus the wireless controller 210b does not work (S12). This inactivates the wireless communicating function of the wireless communication part 211b, and inactivates the file server function of the memory card 200b simultaneously. A line of the memory card is partially drawn by a thick solid line in the sequence diagram of FIG. 5, and this line shows an activating period P2 of the wireless communicating function of the wireless communication part 211b.

In the above described nonvolatile memory system of the present embodiment, a user can arbitrarily switch the turning on and off of the power source of the wireless controller 210b. In addition, this can prevent the wireless controller 210b from wastefully consuming an electric power.

(Embodiment 3)

Figure 6:
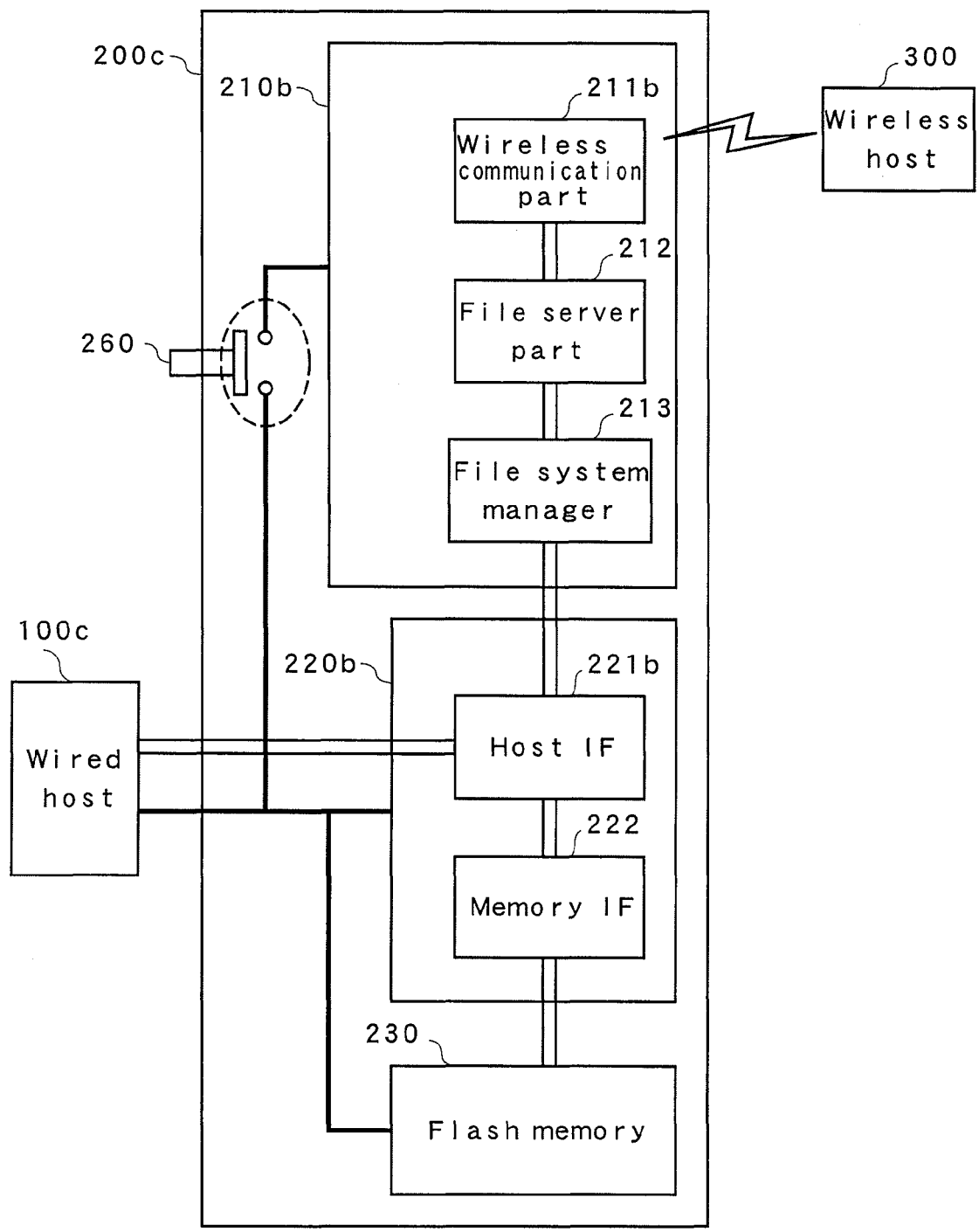
FIG. 6 is a view showing a configuration of a nonvolatile memory system according to embodiment 3 of the present invention.

Referring to FIG. 6 and FIG. 7, embodiment 3 of the present invention will be explained below. FIG. 6 is a block diagram showing a configuration example of a nonvolatile memory system according to embodiment 3 of the present invention. A configuration of the nonvolatile memory system according to the present embodiment includes a wired host 100c, a memory card 200c that is a nonvolatile memory device, and a wireless host 300.

Detailed explanation of the same portions as those of embodiment 2 in FIG. 6 will be omitted by adding the same numerals. The wired host 100c and a switch 260 in the memory card 200c will be explained.

The wired host 100c is a conventional host device, and, when the memory card 200c is attached, detects the attachment and supplies the power source to the memory card 200c.

The switch 260 is a wireless communicating function controller and is provided in the middle of a power source line connecting the wired host 100c to the wireless controller 210b, and disconnects and connects the power source line operated manually by a user. The switch 260 switches the turning on and off of the power source of the wireless controller 210b.

According to the configuration shown in FIG. 6, the power source is supplied to the wireless controller 210b, the controller 220b, and the flash memory 230 from the wired host 100c in the nonvolatile memory system of the present embodiment.

Referring to a sequence diagram of FIG. 7, a method for controlling the power source of the wireless communication part 211b in the memory card 200c in the nonvolatile memory system configured in this manner will be explained.

In an initial state of the nonvolatile memory system, the memory card 200c is attached to the wired host 100c and the power source is supplied to the memory card 200c, and the switch 260 breaks the power source line connecting the wired host 100 to the wireless controller 210b. According to this, the power source is not supplied to the wireless controller 210b, and an access from the wireless host 300 to the memory card 200c is impossible.

When a user enables the access from wireless host 300 to the memory card 200c in the initial state, the user switches the switch 260 of the memory card 200c to connect the power source line connecting the wired host 100c to the wireless controller 210b. This supplies the power source to the wireless controller 210b (S21), and thus the wireless communication function of the wireless communication part 211b is activated.

The memory card 200c in which the wireless communication function of the wireless communication part 211b is activated recognizes the wireless host 300 (S22), and subsequently a connection between the memory card 200c and the wireless host 300 is established (S23). Here, a function of the memory card 200c as a file server is activated.

When the wireless host 300 requires reading or writing of file data for the memory card 200c, file synchronization is executed and the reading and writing of file data is completed (S24).

To inactivate the function of the memory card 200c as a file server, the user switches the switch 260 of the memory card 200c, breaks the power source line connecting the wired host 100c to the wireless controller 210b, and shuts down the power source for the wireless controller 210b (S25). Thus, the wireless communication function of the wireless communication part 211b is inactivated, and the function of the memory card 200c as a file server is inactivated simultaneously. A part of line of the memory card in the sequence view of FIG. 7 is drawn by a thick solid line, and this line shows an active period P3 where the wireless communicating function of the wireless communication part 211b is activated.

Figure 8A:
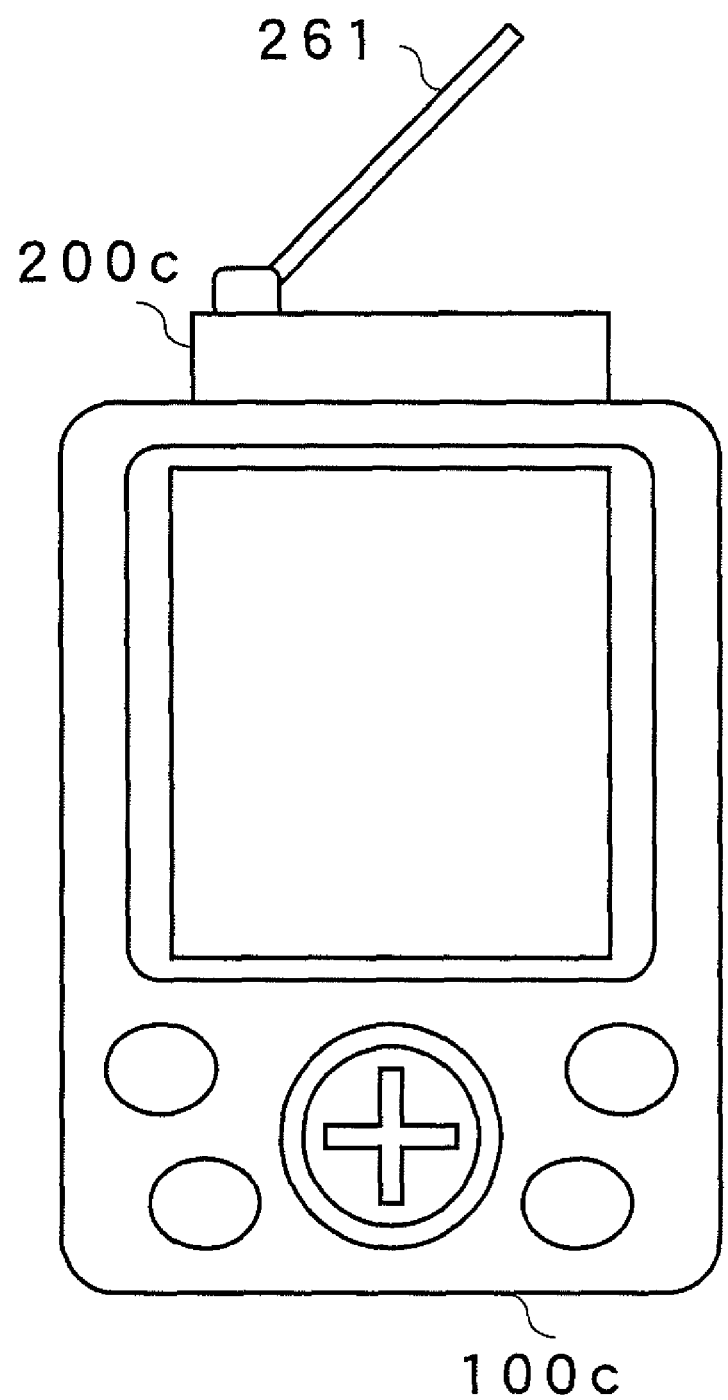
FIG. 8A is a view showing an example of a pattern of a switch 260 according to embodiment 3 of the present invention.
Figure 8B:
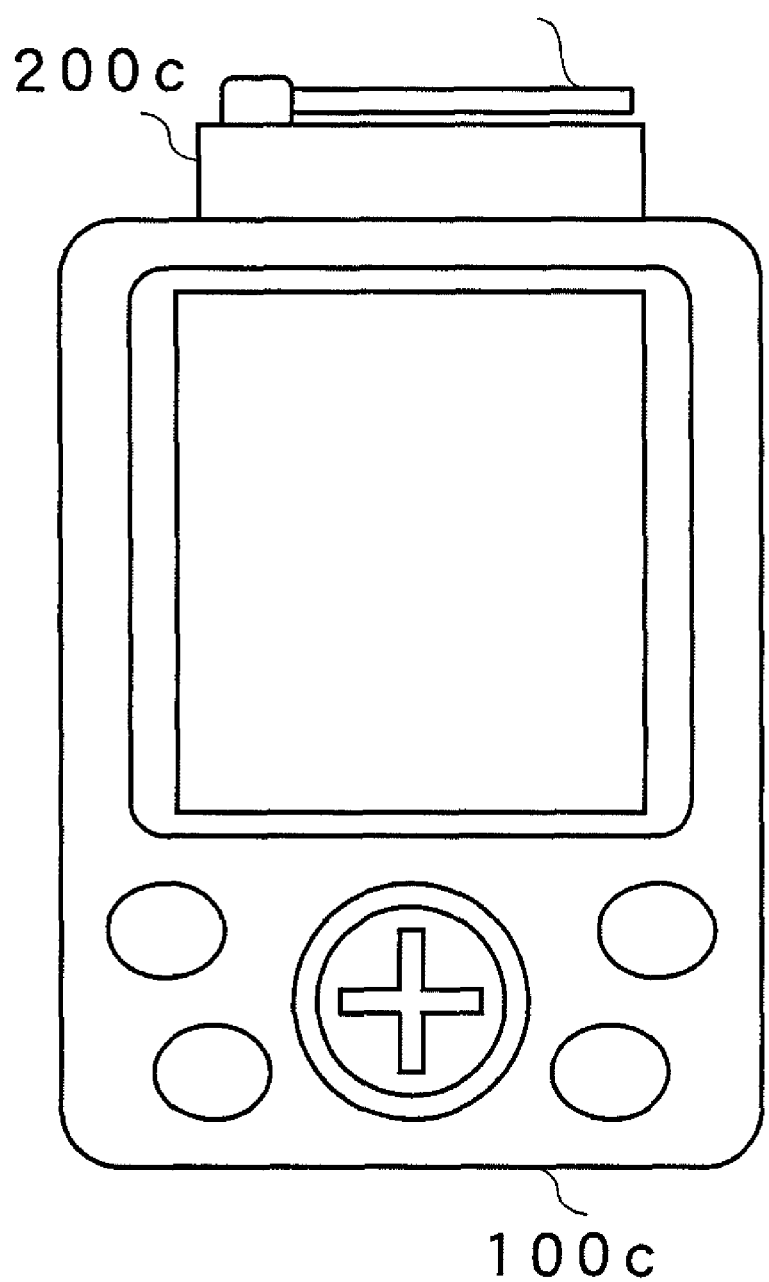
FIG. 8B is an example of the pattern of the switch 260 according to embodiment 3 of the present invention.

At the end of explanation of the present embodiment, an example of configuration of the switch 260 will be explained below. FIG. 8A and FIG. 8B show a state of an antenna 261 connected to the switch 260. In the switch 260, the antenna 261 interlocks with a rotatable portion connected to the memory card 200c, and the switch 260 can be connected and disconnected due to rotation of the antenna 261. As shown in FIG. 8A, when the antenna 261 is stood up, the switch 260 is pressed to be in a state of "on". On the other hand, as shown in FIG. 8B, when the antenna is folded, the press of the switch 260 is released to be in a state of "off".

Figure 9A:
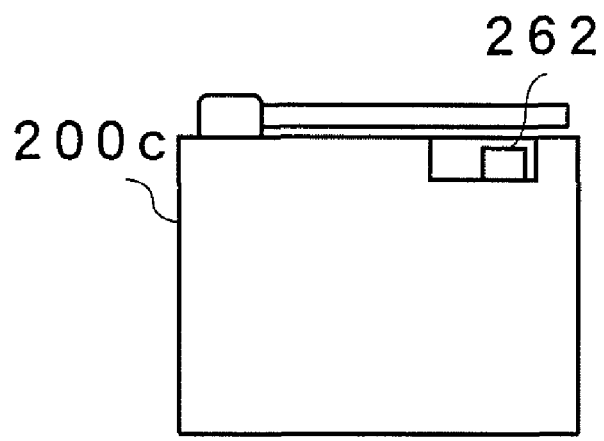
FIG. 9A is an example of the pattern of the switch 260 according to embodiment 3 of the present invention.
Figure 9B:
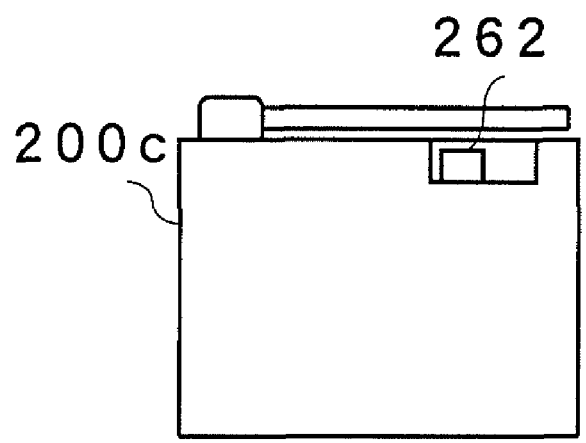
FIG. 9B is an example of the pattern of the switch 260 according to embodiment 3 of the present invention.

Another configuration of the switch is shown in FIG. 9A and FIG. 9B. FIG. 9A and FIG. 9B show a state of a movable part 262 connected to the switch 260. The switch 260 interlocks with a slide of the movable part 262, and the switch 260 can be connected and disconnected by the slide of the movable part 262. As shown in FIG. 9A, when the movable part 262 slides to a right side in the figure, the switch 260 is pressed to be in a state of "on". On the other hand, as shown in FIG. 9B, when the movable part 262 slides to a left side in the figure, the press of the switch 260 is released and the switch 260 is in a state of "off".

When the switch 260 is switched to be "on" or to be "off" by using the antenna 261 and the movable part 262, the function as a file server can be switched to be activated or to be inactivated. However, components other than the antenna 261 and the movable part 262 may be used if the components can connect and disconnect the switch 260.

The power source of the wireless controller 210b can be "on" and "off" by the above described switch 260 provided to the memory card without a special mechanism in the host device.

(Embodiment 4)

Figure 10:
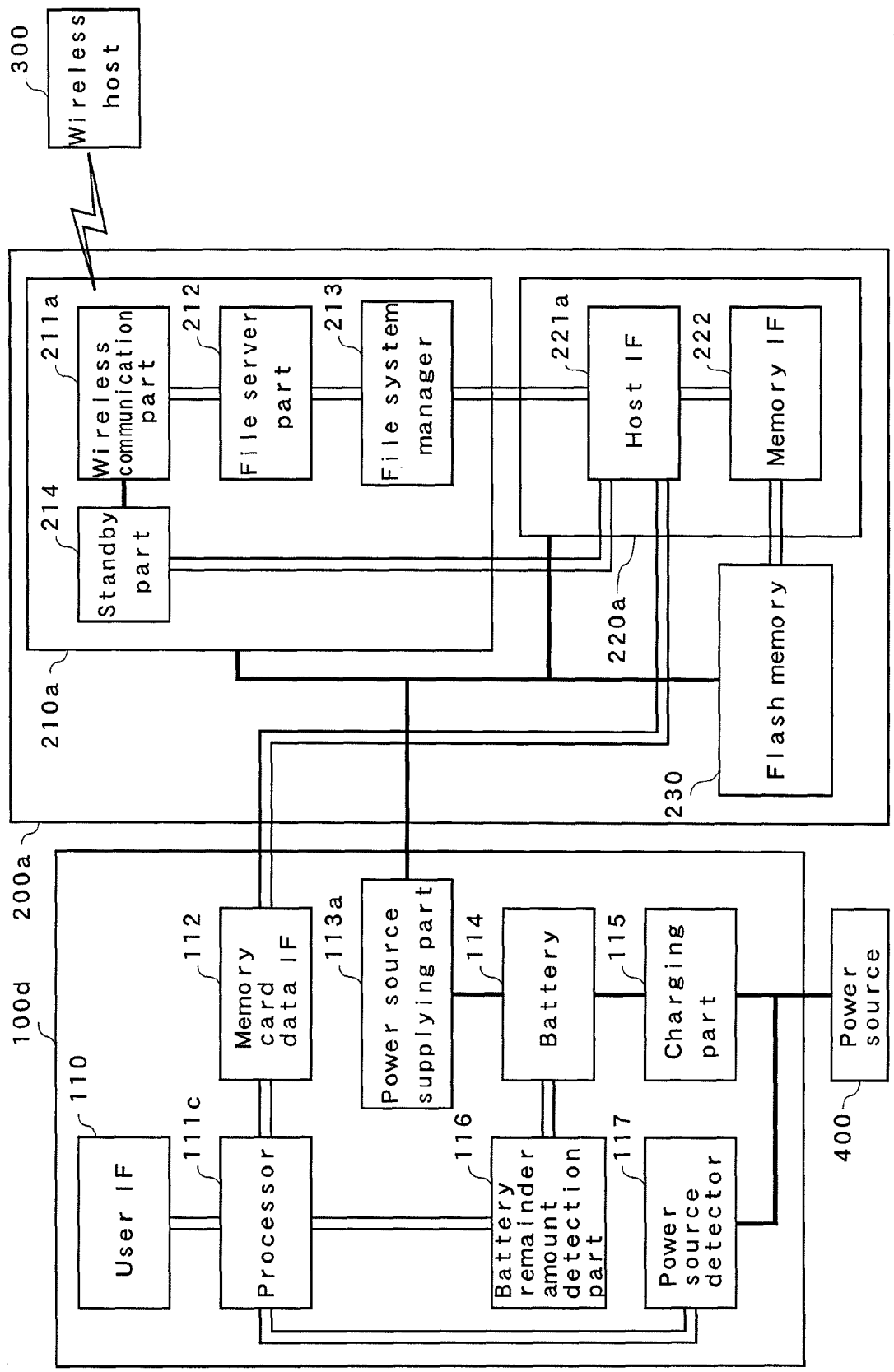
FIG. 10 is a view showing a configuration of a nonvolatile memory system according to embodiment 4 of the present invention.
Figure 11:
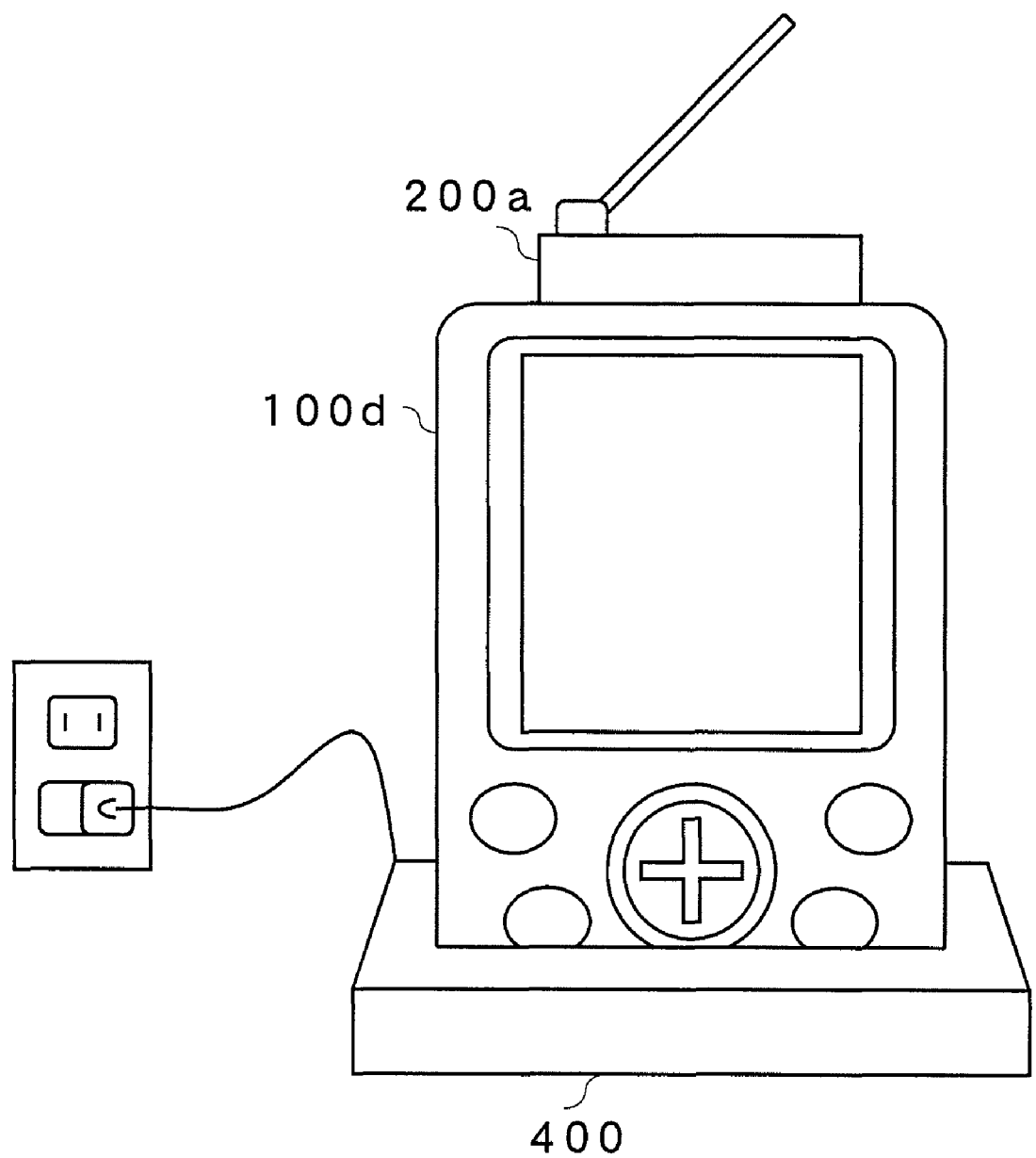
FIG. 11 is a schematic view showing the configuration of the nonvolatile memory system according to embodiment 4 of the present invention.
Figure 12:
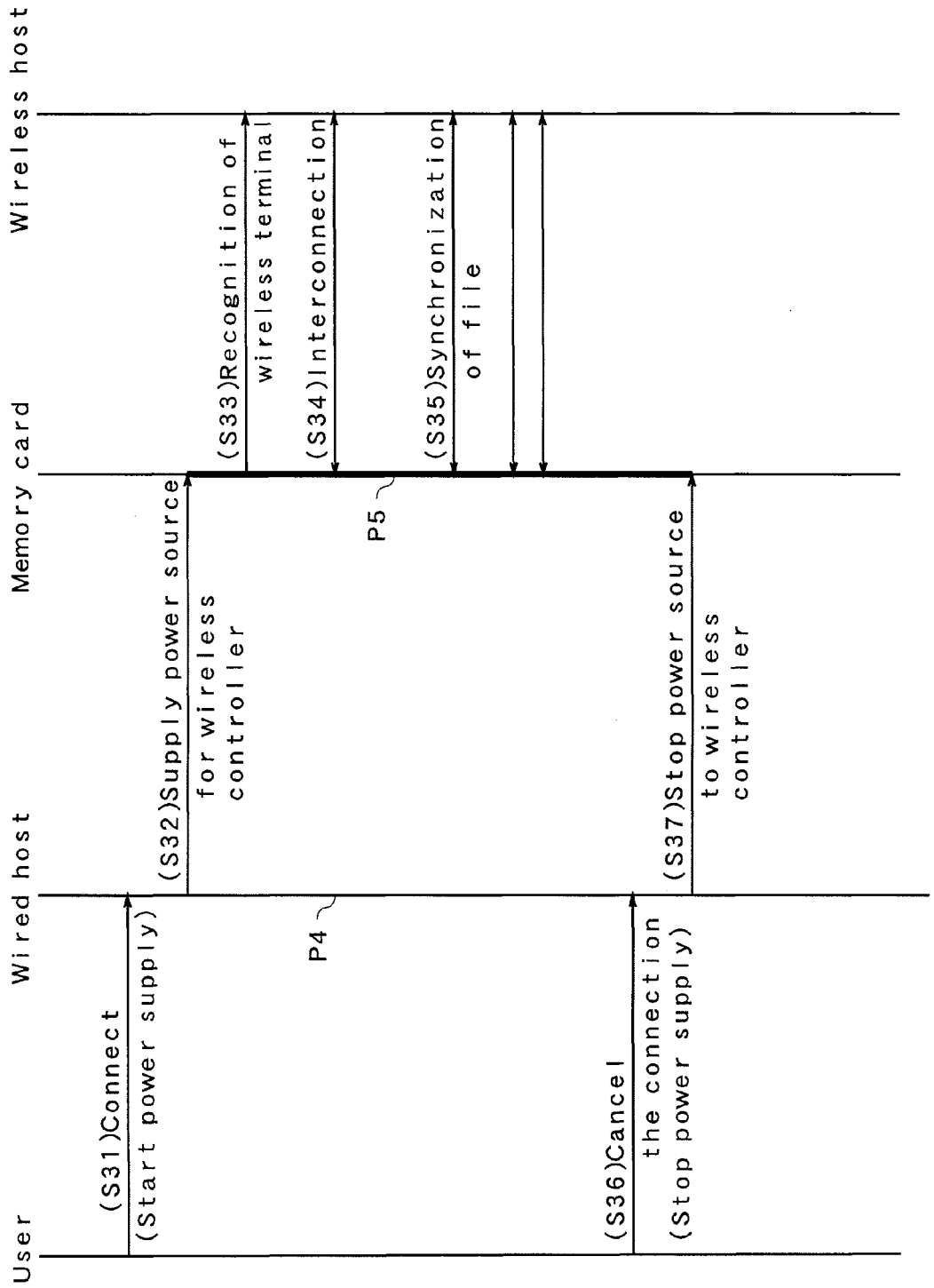
FIG. 12 is a sequence diagram showing an operation of the nonvolatile memory system according to embodiment 4 of the present invention.

Referring to FIG. 10 to FIG. 12, embodiment 4 of the present invention will be explained. FIG. 10 is a block diagram showing a configuration example of a nonvolatile memory system according to embodiment 4 of the present invention. FIG. 11 is a view showing a state where a wired host 100d of the present embodiment is attached to a power source 400. The configuration of nonvolatile memory system according to the present embodiment includes the wired host 100d, the memory card 200a that is a nonvolatile memory device, the wireless host 300, and the power source 400.

In FIG. 10, explanation of the portions identical with those of embodiment 1 is omitted by adding the identical numerals to the portions. Here, the wired host 10d, a processor 111c, and a power source detector 117 will be explained.

The processor 111c receives a notification from the power source detector 117 and transmits a command to the memory card data IF 112 in addition to operations of the processor 111a of embodiment 1.

The power source detector 117 detects a connection of the power source 400 and notifies the connection to the processor 111c.

Referring to sequence diagrams of FIG. 11 and FIG. 12, an operation of the nonvolatile memory system having the above described configuration and a state of the power source will be explained below.

At first, a user connects the wired host 100d to the power source 400 (S31). The power source detector 117 notifies the processor 111c of the connection of the wired host to the power source 400. This notification is transmitted to the host interface 221a of the controller 220a from the processor 111c via the memory card data IF 112 as a command for ordering to turn on the power source of the wireless communication part 211a. The host interface 221a transmits this command to the standby part 214, the standby part 214 receives the command and turns on the power source of the wireless communication part 211a, and thus the wireless communication part 211a is in an operational state (S32).

The memory card 200a in which the power source is supplied to the wireless communication part 211a recognizes the wireless host 300 (S33), and subsequently a connection between the memory card 200a and the wireless host 300 is established (S34). Here, a function of the memory card 200a as a file server is activated.

When the wireless host 300 requires the memory card 200a to read or write file data, file synchronization is executed and the reading and writing of file data is completed (S35).

When the user detaches the wired host 100d from the power source 400 (S36), the power source detector 117 notifies the processor 111c of the detachment of the wired host 100d from the power source 400. This notification is transmitted to the host interface 221a of the memory card 200a from the processor 111c via the memory card data IF 112 as a command for ordering to turn off the power source of the wireless communication part 211a. The host interface 221a transmits this command to the standby part 214, the standby part 214 receives the command and turns off the power source of the wireless communication part 211a, and thus the wireless communication part 211a does not operate. Thus, the wireless communication function of the wireless communication part 211a is inactivated, and the function of the memory card 200a as a file server is inactivated simultaneously (S37). A part of line of the memory card in the sequence view of FIG. 12 is drawn by a thick solid line, and this line shows a power feeding period P4 where the power source detector 117 detects the power source 400 and an active period P5 where the wireless communicating function of the wireless communication part 211a is activated.

The nonvolatile memory system of the present embodiment is configured by incorporating the power source detector 117 into the nonvolatile memory system of embodiment 1, however, the power source detector 117 can also be incorporated into the nonvolatile memory system of embodiment 2.

That is, the power source detector 117 is incorporated into the nonvolatile memory system in FIG. 4 of embodiment 2, and is connected to the power source 400 by a power source line and further to the power source supplying part 113b by the signal line. When the power source 400 is connected to the charging part 115, the power source detector 117 detects the connection of the power source 400 and notifies the processor 111b of the connection. The processor 111b transmits a command for ordering to turn on the power source of the wireless controller 210b to the power source supplying part 113b. The power source supplying part 113b receives this command and supplies the power source to the wireless communication part power supplying line 240, and the power source can be supplied to the wireless communication part 210b. On the other hand, when the power source 400 is detached from the charging part 115, the power source detector 117 detects the detachment of the power source 400 and notifies the processor 111b of the detachment. The processor 111b transmits a command for ordering to turn off the power source of the wireless controller 210b to the power source supplying part 113b. The power source supplying part 113b receives the command and turns off supply of the power source of the wireless communication part power supplying line 240, and thus the power source to the wireless communication part 210b can be turned off.

According to the above mentioned nonvolatile memory system, the user can turn on and off the power source of the wireless controller and the wireless communication part 211a by only attaching and detaching the wired host 100d to and from the power source 400 without complex operations.

(Embodiment 5)

Figure 13:
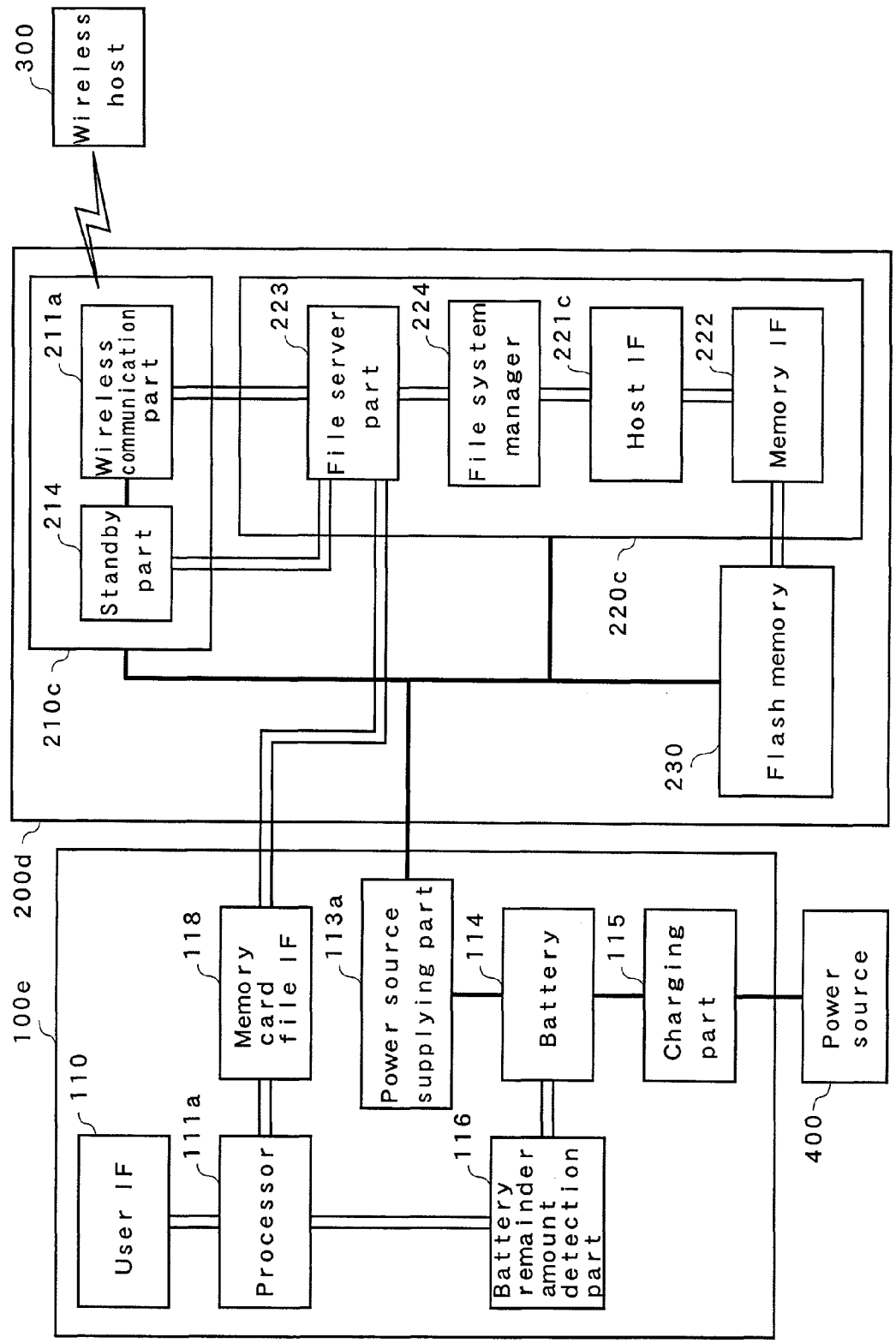
FIG. 13 is a view showing a configuration of a nonvolatile memory system according to embodiment 5 of the present invention.
Figure 14:
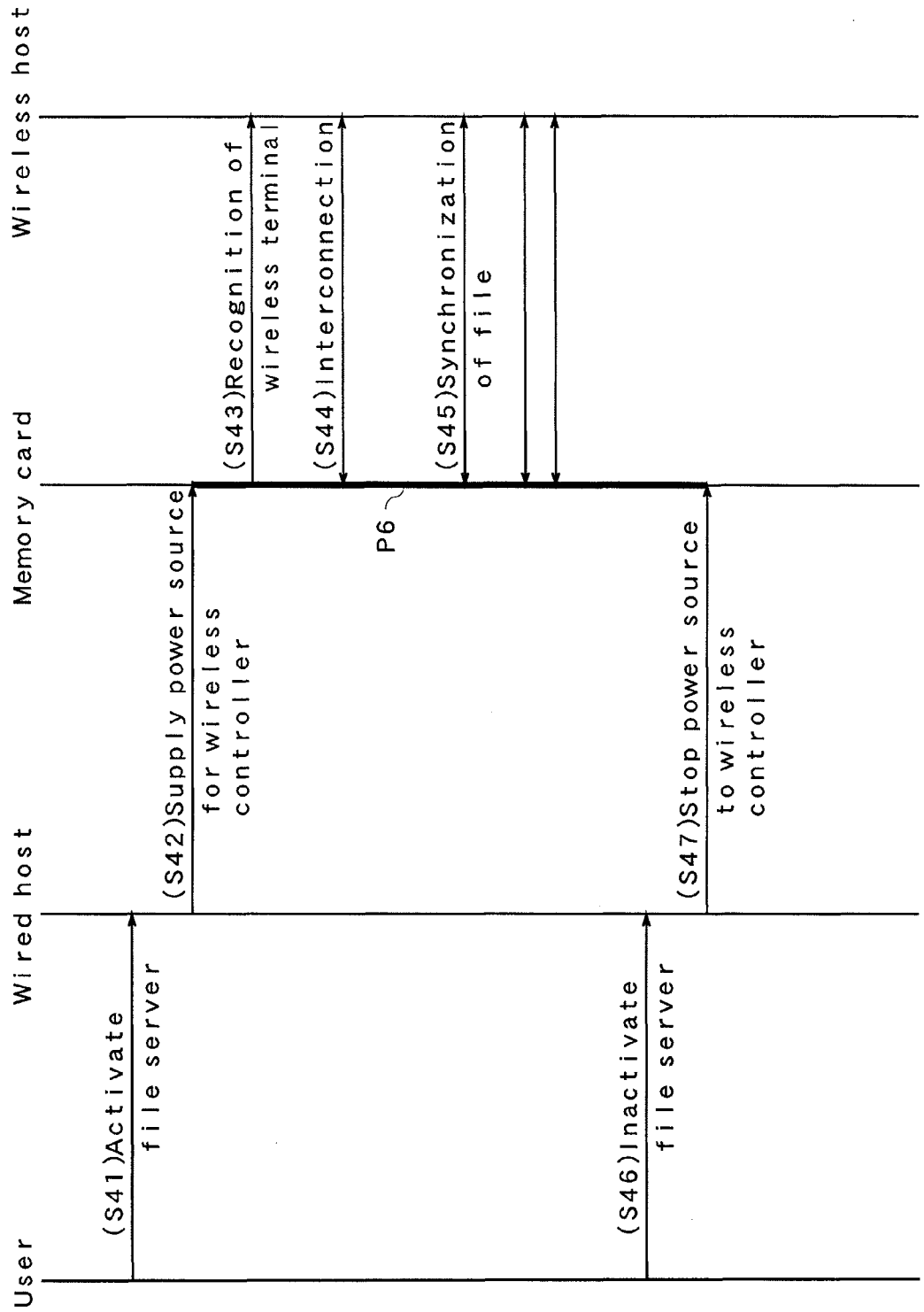
FIG. 14 is a sequence diagram showing an operation of the nonvolatile memory system according to embodiment 5 of the present invention.

Referring to FIG. 13 and FIG. 14, embodiment 5 of the present invention will be explained. FIG. 13 is a block diagram showing a configuration example of a nonvolatile memory system according to embodiment 5 of the present invention. The configuration of nonvolatile memory system according to the present embodiment includes the wired host 100e, a memory card 200d that is a nonvolatile memory device, the wireless host 300, and the power source 400.

In FIG. 13, explanation of the portions identical with those of embodiment 1 is omitted by adding the identical numerals to the portions. Here, a memory card file IF 118 of the wired host 100e and a controller 220c of the memory card 200d will be explained.

The memory card file IF 118 controls reading and writing of files by using an interface of a plurality of signal lines other than the power source among the interfaces with the memory card 200d. The memory card file interface (IF) 118 sends file data and commands transmitted from the processor 111a to the memory card 200d, and sends file data and commands transmitted from the memory card 200d to the processor 111a.

The controller 220c includes a host interface (IF) 221c, the memory interface (IF) 222, a file server part 223, and a file system manager 224.

The file server part 223 controls reading and writing of file data between the memory card file IF 118 of the wired host 100e and the wireless communication part 211a, and transmits and receives file data to and from the file system manager 224. The file server part 223 is connected to the standby part 214, the memory card file IF 118, the wireless communication part 221a, and the file system manager 224 by signal lines.

The file system manager 224 manages a file system structure of file data to be transmitted and received between the wired host 100e and the wireless host 300. The file system manager 224 is connected to the file server part 223 and the host interface 221c by signal lines.

The host interface 221c controls the wired host 100e and the wireless host 300 on an interface concerning data transmission and reception. The host interface 221c is connected to the memory interface 222 and the file system manager 224 by signal lines.

Referring to FIG. 14, a method for controlling the power source of the wireless communication part 211a in the memory card 200d in the nonvolatile memory system having such configuration will be explained.

At first, an initial state of the memory card 200d is assumed to be a state where the standby part 214 of the memory card 200d turns off the power source of the wireless communication part 211a and where an access from the wireless host 300 to the memory card 200d is impossible.

In a case where a user enables the access from the wireless host 300 to the memory card 200d in this initial state, the user issues an order for activating a function of the memory card 200d as a file server via GUI of the user interface 110 in the wired host 100e (S41).

The order issued at S41 is transmitted to the file server part 223 of the memory card 200d from the processor 111a via the memory card file IF 118 as a command for ordering to turn on the power source for the wireless communication part 211a. The file server part 223 sends this command to the standby part 214, and the standby part 214 receives the command and turns on the power source of the wireless communication part 211a, and thus the wireless communication part 211a operates (S42). According to this, the wireless communication function of the wireless communication part 211a is activated.

The memory card 200d in which the power source is supplied to the wireless communication part 211a recognizes the wireless host 300 (S43), and subsequently a connection between the memory card 200d and the wireless host 300 is established (S44). Here, a function of the memory card 200d as a file server is activated.

When the wireless host 300 requires the memory card 200d to read or write file data, file synchronization is executed and the reading and writing of file data is completed (S45).

When inactivating the function of the memory card 200d as a file server, the user issues an order for inactivating the function of the memory card 200d as a file server via GUI of the user interface 110 in the wired host 100e (S46).

The order issued at S46 is transmitted to the file server part 223 of the memory card 200d from the processor 111a via the memory card file IF 118 as a command for ordering to turn off the power source for the wireless communication part 211a. The file server part 223 transmits this command to the standby part 214, and the standby part 214 which received the command turns off the power source of the wireless communication part 211a, and thus the wireless communication part 211a does not operate (S47). According to this, the wireless communication function of the wireless communication part 211a is inactivated, and the function of the memory card 200d as a file server is inactivated simultaneously. A part of line of the memory card in the sequence view of FIG. 14 is drawn by a thick solid line, and this line shows an active period P6 where the wireless communicating function of the wireless communication part 221 is activated.

In the present embodiment, the file server part and the file system manager are arranged not in the wireless controller 220c but in the controller 220c. This eliminates a problem of file management in a case where a plurality of hosts, the wired host and the wireless host, simultaneously access the memory card 200d. That is, since a plurality of the hosts cannot simultaneously modify data of a certain file by conducting the file management on accesses from a plurality of hosts in one file system manager, destruction of file data can be prevented.

According to embodiments 1 to 5, the wireless communication function of memory card can be switched to "activated" or to "inactivated" only by an order or an operation of user who operates the wired host. Accordingly, a third party can be prevented from sharing, against the user's will, data of a memory card via the wireless communication function. That is, it can be prevented that, even though the user attaches the memory card to the host device and uses the memory card, another host device capable of wireless communication reads data of the memory card and writes data to the memory card. For this reason, deterioration of a performance of access to a memory card from a host to which the memory card is attached and unnecessary consumption of a battery can be avoided.

Also in embodiments 2 and 5 of the present invention, a configuration where a PDA is used as a wired host and a memory card is attached to the PDA as shown in FIG. 2 can be employed as embodiment 1. The memory card accordingly transfers a file with a wireless host without passing through a wired host. A file server function highly convenient for a user which enables downloading of new contents file from the wireless host to the memory card via a network can be provided.

In embodiments 1 to 5 of the present invention, a memory card using a flash memory as a nonvolatile memory device is shown, however, if the memory is a nonvolatile memory device, an effect of the present invention can be obtained regardless of a type of the memory. For example, the memory may be a hard disk drive for magnetic recording, an optical disk, and a SRAM backed up by a battery. In addition, the memory may be configured by combining plural types of nonvolatile memory devices. For example, the memory may be configured by combining a semiconductor memory such as a NAND type flash memory and a hard disk.

Moreover, the present invention does not limit an internal configuration of the memory card to three physical chips of a controller, a flash memory, and a wireless controller. The controller, the flash memory, and the wireless controller may be configured on two or less chips or may be configured on four or more chips.

INDUSTRIAL APPLICABILITY

The present invention can be applied to a nonvolatile memory system using a memory card having a wireless communication function and especially can determine whether an operation of the wireless communication function is activated or not based on an order or an operation of user handling the memory card, ant thus contributes to a user convenience.

The invention claimed is:

1. A nonvolatile memory device configured to read and write data from a first outside source, comprising:
a nonvolatile memory for storing data;
a controller, which receives a power source supplied from the first outside source by a first wire, for performing data communication with the first outside source by a second wire and for performing data reading and writing with said nonvolatile memory; and
a wireless controller including:
a wireless communicator, which receives the power source supplied from the first outside source by a wire, for performing wireless data communication with a second outside source and for performing data reading and writing with said nonvolatile memory; and
a wireless communicating function controller for switching a wireless data communication function by said wireless communicator to be on or to be off based on an order from the first outside source.

2. The nonvolatile memory device according to claim 1, wherein
said wireless communicating function controller is a switch for switching the wireless data communication function in said wireless communicator to be on or to be off by switching the power source of said wireless communicator to be on or to be off based on an order from the first outside source.

3. The nonvolatile memory device according to claim 1, wherein
said wireless communicating function controller is a switch for switching the wireless data communication function in said wireless communicator to be on or to be off by connecting and disconnecting a power source line of the power source supplied to said wireless controller from the first outside source.

4. The nonvolatile memory device according to claim 3, wherein said switch is a slider provided to said nonvolatile memory device.

5. The nonvolatile memory device according to claim 3, wherein said switch is an antenna for performing wireless communication.

6. A nonvolatile memory device configured to read and write data from a first outside source, comprising:
a nonvolatile memory for storing data;
a controller, which receives a power source supplied from the first outside source by a first wire, for performing data communication with the first outside source by a second wire and for performing data reading and writing with said nonvolatile memory;
a wireless controller including:
a wireless communicator, which receives the power source supplied from the first outside source by the first wire, for performing wireless data communication with a second outside source and for performing data reading and writing with said nonvolatile memory; and
a wireless communicating function controller for switching a wireless data communication function by said wireless communicator to be on or to be off based on an order from the first outside source; and
a plurality of independent power source lines for receiving a power source supplied from the first outside source by wires, wherein
the plurality of said independent power source lines include a power line for supplying the power source supplied from the first outside source to said wireless controller.

7. A host device configured to attach to and detach from a nonvolatile memory device, comprising:
a power source supplying power to the nonvolatile memory device by a wire when connecting to the nonvolatile memory device, the nonvolatile memory having a wireless communication function;
a user interface for inputting an order to the nonvolatile memory device; and
a processor for transmitting the order to switch the wireless communication function of said nonvolatile memory device to be activated or to be deactivated to said nonvolatile memory device based on the order received from said user interface.

8. A host device configured to attach to and detach from a nonvolatile memory device having a wireless controller for performing wireless communication, comprising:
a user interface for inputting an order to the nonvolatile memory device;
a power source supply, which includes a power source terminal for supplying a power source to said wireless controller and a plurality of independent power source terminals for supplying the power source to respective portions other than the wireless controller in said nonvolatile memory device, for switching the power source terminal for supplying the power source to said wireless controller to be connected or to be disconnected; and
a processor for transmitting the order to switch the power source terminal for supplying the power source to said wireless controller to be connected or to be disconnected to said power source supply based on the order received from said user interface.

9. A host device configured to attach to and detach from a nonvolatile memory device having a wireless communication function and to supply a power source to the nonvolatile memory device by a wire when connecting to the nonvolatile memory device, comprising:
a power source detector for detecting whether the power source is supplied to the nonvolatile memory device; and
a processor for transmitting an order to switch the wireless communication function of said nonvolatile memory device to be activated or to be deactivated to said nonvolatile memory device depending on the detection by said power source detector.

10. A nonvolatile memory system, comprising:
a wired host device;
a nonvolatile memory device configured to attach to and detach from said host device and perform data communication with said host device by a wire, the nonvolatile memory device includes a wireless communication function; and
a wireless host device which performs the data communication with said a nonvolatile memory device, wherein
said nonvolatile memory device includes:
a nonvolatile memory for storing data;
a controller, which receives a power source supplied from the wired host device by a wire, for performing data communication with the wired host device by a wire and for performing data reading and writing with said nonvolatile memory; and
a wireless controller including:
a wireless communicator, which receives the power source supplied from the wired host device by a wire, for performing wireless data communication with the wireless host device and for performing data reading and writing with said nonvolatile memory; and a wireless communicating function controller for switching a wireless data communication function by said wireless communicator to be on or to be off based on an order from the wired host device.

11. The nonvolatile memory system according to claim 10, wherein said wired host device includes:

a power source detector for detecting whether the power source is supplied to the nonvolatile memory device; and a processor for transmitting an order to switch the wireless communication function of said nonvolatile memory device to be activated or to be deactivated to said nonvolatile memory device depending on the detection by said power source detector based on whether the power source is supplied from the wired host device, and said wireless communicating function controller is a switch for switching the wireless data communication function in said wireless communicator to be on or to be off by switching a power source of said wireless communicator to be on or to be off based on the order from the wired host device.

12. The nonvolatile memory system according to claim 10, wherein said wired host device includes:

a user interface for inputting the order to the nonvolatile memory device; and a processor for transmitting the order to switch a wireless communication function of said nonvolatile memory device to be activated or to be deactivated to said nonvolatile memory device based on the order received from said user interface, and said wireless communicating function controller is a switch for switching the wireless data communication function in said wireless communicator to be on or to be off by switching the power source of said wireless communicator to be on or to be off based on the order from the wired host device.

13. A nonvolatile memory system, comprising:

a wired host device;

a nonvolatile memory device configured to attach to and detach from said host device and which performs data communication with said host device by a wire, the nonvolatile memory device includes a wireless communication function; and a wireless host device which performs the data communication with said a nonvolatile memory device, wherein said nonvolatile memory device includes:

a nonvolatile memory for storing data;

a controller, which receives a power source supplied from the wired host device by a wire, for performing data communication with the wired host device by a wire and for performing data reading and writing with said nonvolatile memory; and a wireless controller including:

a wireless communicator, which receives the power source supplied from the wired host device by a wire, for performing wireless data communication with the wireless host device and for performing data reading and writing with said nonvolatile memory; and a wireless communicating function controller for switching a wireless data communication function by said wireless communicator to be on or to be off based on an order from the wired host device; and a plurality of independent power source lines which receive a power source supplied from the wired host device, and include a power line for supplying the power source from the wired host device to said wireless controller, and said wired host device includes:

a user interface for inputting the order to the nonvolatile memory device;

a power source supply, which includes a power source terminal for supplying a power source to said wireless controller and a plurality of independent power source terminals for supplying the power source to respective portions other than the wireless controller in said nonvolatile memory device, for switching the power source terminal for supplying the power source to said wireless controller to be connected or to be disconnected; and a processor for transmitting the order to switch the power source terminal for supplying the power source to said wireless controller to be connected or to be disconnected to said power source supply based on the order received from said user interface.

14. The nonvolatile memory device according to claim 10, wherein said wireless communicating function controller is a switch for switching the wireless data communication function in said wireless communicator to be on or to be off by connecting and disconnecting a power source line of the power source supplied to said wireless controller from the wired host device.

15. The nonvolatile memory device according to claim 14, wherein said switch is a slider provided to said nonvolatile memory device.

16. The nonvolatile memory device according to claim 14, wherein said switch is an antenna for performing wireless communication.

17. A nonvolatile memory system, comprising:

a wired host device;

a nonvolatile memory device configured to attach to and detach from said host device and which performs data communication with said host device by a wire and which includes a wireless communication function; and a wireless host device which performs the data communication with said a nonvolatile memory device, wherein said nonvolatile memory device includes:

a nonvolatile memory for storing data;

a controller, which receives a power source supplied from said host device by a wire, for performing data communication with said host device by a wire and for performing data reading and writing with said nonvolatile memory; and a wireless controller including:

a wireless communicator, which receives the power source supplied from said host device by a wire, for performing wireless data communication with said wireless host device and for performing data reading and writing with said nonvolatile memory; and a wireless communicating function controller for switching the power source supplied from said host device to be on or to be off; and a plurality of independent power source lines which receive a power source supplied from said host device and include a power line for supplying the power source from said host device to said wireless controller, and said wired host device includes:

a power source detector for detecting whether the power source is supplied to the nonvolatile memory device;

a power source supply, which includes a power source terminal for supplying a power source to said wireless controller and a plurality of independent power source terminals for supplying the power source to respective portions other than the wireless controller in said non-volatile memory device, for switching the power source terminal for supplying the power source to said wireless controller to be connected or to be disconnected; and a processor for transmitting an order to switch the power source terminal for supplying the power source to said wireless controller to be connected or to be disconnected to said power source supply depending on the detection by said power source detector based on whether the power source is supplied.

\* \* \* \* \*